(12) United States Patent
Yokohama et al.

(10) Patent No.: US 9,518,736 B2
(45) Date of Patent: Dec. 13, 2016

(54) WATER-CONTAINING SOLID FUEL DRYING APPARATUS AND DRYING METHOD

(75) Inventors: Katsuhiko Yokohama, Nagasaki (JP);
Kenichiro Kosaka, Nagasaki (JP);
Keigo Matsumoto, Nagasaki (JP);
Noboru Kawamoto, Nagasaki (JP);
Yoshiki Yamaguchi, Nagasaki (JP);
Masaaki Kinoshita, Nagasaki (JP);
Koji Ohura, Nagasaki (JP); Atsushi Tsutsumi, Tokyo (JP); Shozo Kaneko, Tokyo (JP); Kazuhiro Mochizuki, Tokyo (JP); Chihiro Fushimi, Tokyo (JP); Yasuki Kansha, Tokyo (JP)

(73) Assignees: MITSUBISHI HEAVY INDUSTRIES, LTD., Tokyo (JP); THE UNIVERSITY OF TOKYO, Tokyo (JP)

( * ) Notice: Subject to any disclaimer, the term of this patent is extended or adjusted under 35 U.S.C. 154(b) by 861 days.

(21) Appl. No.: 13/319,865

(22) PCT Filed: May 25, 2010

(86) PCT No.: PCT/JP2010/058830
§ 371 (c)(1),
(2), (4) Date: Jan. 30, 2012

(87) PCT Pub. No.: WO2010/137591
PCT Pub. Date: Dec. 2, 2010

(65) Prior Publication Data
US 2012/0117816 A1  May 17, 2012

(30) Foreign Application Priority Data

May 28, 2009 (JP) ................................ 2009-128513

(51) Int. Cl.
*F26B 3/08* (2006.01)
*F23K 1/04* (2006.01)
(Continued)

(52) U.S. Cl.
CPC . *F23K 1/04* (2013.01); *C10L 9/08* (2013.01);
*F26B 23/004* (2013.01);
(Continued)

(58) Field of Classification Search
CPC .................. C10J 2300/1807; C10J 2300/0976;
C10J 2300/093; C10J 2300/0956; C10J
2300/1659; C10J 2300/0959; C10J
2300/0986; C10J 2300/1637; C10J
2300/0909; C10J 2300/0916; C10J
2300/1853; C10J 3/463; F26B
23/02; F23K 2201/20; F23K 1/00; F23K
1/04
(Continued)

(56) References Cited

U.S. PATENT DOCUMENTS 2,601,676 A * 6/1952 Trainer et al. ................ 208/164
3,779,181 A * 12/1973 Staffin et al. .................. 110/228
(Continued)

FOREIGN PATENT DOCUMENTS

DE    3618333 A1    12/1987
DE    19612186     * 10/1997
(Continued)

OTHER PUBLICATIONS

Canadian Decision to Grant a Patent dated Oct. 4, 2013 in corresponding Canadian Patent Application No. 2,761,729 with concise statement of relevance.
(Continued)

*Primary Examiner* — Jason Lau
(74) *Attorney, Agent, or Firm* — Wenderoth, Lind & Ponack, L.L.P.

(57) ABSTRACT

A water-containing solid fuel drying apparatus that can efficiently dry with low energy consumption by effectively utilizing sensible heat and latent heat of a heating medium
(Continued)

for drying, etc. is provided. A drying apparatus (10) that dries water-containing solid fuel includes a dryer (20) that injects scavenging gas into the interior of a drying vessel (21) in which a heat transfer pipe (22) is disposed; a dust collector (13) that removes microparticles from microparticle-containing mixed gaseous fluid that has flowed out of the drying vessel (21); a compressor (30) that compresses vapor-containing mixed gaseous fluid; a vapor heat exchanger (31) that preheats low-pressure mixed gaseous fluid with high-pressure mixed gaseous fluid compressed at the compressor (30); and a gas-liquid separator (14), in which the high-pressure mixed gaseous fluid is employed as drying gas that radiates heat by passing through the heat transfer pipe (22), that performs gas-liquid separation of water-containing scavenging gas that has flowed out of the heat transfer pipe (22) while containing condensed water of vapor generated due to heat radiation, wherein the water-containing solid fuel is dried by heating the water-containing solid fuel in the drying vessel (21) utilizing latent heat and sensible heat of the mixed gaseous fluid.

12 Claims, 4 Drawing Sheets

(51) Int. Cl.
*C10L 9/08* (2006.01)
*F26B 23/00* (2006.01)
(52) U.S. Cl.
CPC ........... *F23K 2201/20* (2013.01); *Y02B 30/52* (2013.01); *Y02E 50/30* (2013.01); *Y02P 70/405* (2015.11)
(58) Field of Classification Search
USPC .... 110/224, 229, 245, 342, 218; 34/86, 218, 34/360, 477; 165/42; 210/180
See application file for complete search history.

(56) References Cited

U.S. PATENT DOCUMENTS

| | | | | |
|---|---|---|---|---|
| 4,242,808 A | * | 1/1981 | Luthi | 34/459 |
| 4,542,621 A | * | 9/1985 | Andersson et al. | 60/775 |
| 4,601,113 A | * | 7/1986 | Draper et al. | 34/359 |
| 5,146,857 A | * | 9/1992 | Spliethoff et al. | 110/234 |
| 5,175,993 A | * | 1/1993 | Raiko et al. | 60/775 |
| 5,261,225 A | * | 11/1993 | Dickinson | 60/39.55 |
| 5,291,668 A | * | 3/1994 | Becker et al. | 34/86 |
| 5,474,034 A | * | 12/1995 | Gounder | 122/4 D |
| 5,664,425 A | * | 9/1997 | Hyde | 62/90 |
| 5,697,307 A | * | 12/1997 | Nelson et al. | 110/345 |
| 5,899,003 A | * | 5/1999 | Strommen et al. | 34/363 |
| 6,014,856 A | * | 1/2000 | Bronicki et al. | 60/39.12 |
| 6,165,249 A | * | 12/2000 | Swanson | 75/381 |
| 7,487,601 B2 | * | 2/2009 | Carin et al. | 34/381 |
| 2001/0015060 A1 | * | 8/2001 | Bronicki et al. | 60/39.6 |
| 2002/0004566 A1 | * | 1/2002 | Ford et al. | 526/91 |
| 2002/0054836 A1 | * | 5/2002 | Kirkbride et al. | 422/139 |
| 2003/0077497 A1 | * | 4/2003 | Cao | 429/26 |
| 2005/0132883 A1 | * | 6/2005 | Su et al. | 95/235 |
| 2006/0225430 A1 | * | 10/2006 | Paprotna et al. | 60/782 |
| 2008/0163804 A1 | * | 7/2008 | Hauk | 110/224 |
| 2009/0053036 A1 | * | 2/2009 | Crawley et al. | 415/58.4 |

FOREIGN PATENT DOCUMENTS

| | | |
|---|---|---|
| JP | 57-82683 | 5/1982 |
| JP | 61-250096 | 11/1986 |
| JP | 3685477 | 8/2005 |
| JP | 2005-241239 | 9/2005 |
| JP | 2005-291526 | 10/2005 |
| JP | 2007-333278 | 12/2007 |
| WO | 2007/145187 | 12/2007 |

OTHER PUBLICATIONS

Japanese Decision to Grant a Patent issued Jun. 25, 2013 in corresponding Japanese Application No. 2009-128513, with explanation of relevance.
International Search Report issued Aug. 17, 2010 in International (PCT) Application No. PCT/JP2010/058830 w/English translation.
Decision to Grant a Patent issued Mar. 13, 2015 in corresponding Malaysian Patent Application No. PI 2011005469.
Decision to Grant a Patent issued Jan. 8, 2015 in corresponding Australian Patent Application No. 2010253044.
Notice of Allowance issued Mar. 2, 2016 in corresponding European Patent Application No. 10780546.7.

* cited by examiner

WATER-CONTAINING SOLID FUEL DRYING APPARATUS AND DRYING METHOD

TECHNICAL FIELD

The present invention relates to a water-containing solid fuel drying apparatus and a drying method for drying solid fuel with a high water content as in, for example, biomass.

BACKGROUND ART

Known techniques in the related art for drying water-containing solid fuel, such as biomass, include those disclosed in the Patent Literature described below.

The related art disclosed in Patent Literature 1 is a method of drying biomass utilizing sensible heat of combustion exhaust gas, wherein moisture is separated from the combustion exhaust gas with a condenser after drying and the gas is mixed with combustion air and supplied to a boiler.

The related art disclosed in Patent Literature 2 is a steam heat-pump drying apparatus provided with a switching valve in a steam compressor system that is configured so as to perform a drying operation through a steam heat-pump cycle and a through-flow drying operation, as well as an operating method thereof. In this case, the valve is opened/closed in accordance with the water content of a material to be dried; when drying a material with high water content, drying is performed with vapor; and, when drying a material with low water content, through-flow drying is performed.

The related art disclosed in Patent Literature 3 is an evaporator in which escape control for adjusting pressure is carried out at a compressor outlet and a drain trap is provided at a condenser outlet. This evaporator has enhanced thermal efficiency by providing, in addition to employing a steam compressor, a heat exchanger for performing heat exchange between compressor-inlet gas and compressor-outlet gas and, furthermore, utilizes sensible heat of a noncondensable gas to preheat the raw material by circulating the noncondensable gas in the system, thereby promoting heat conduction and lowering the drying temperature.

CITATION LIST

Patent Literature

{PTL 1} Japanese Unexamined Patent Application, Publication No. 2005-291526.
{PTL 2} The Publication of Japanese Patent, No. 3685477.
{PTL 3} Japanese Unexamined Patent Application, Publication No. 2007-333278.

SUMMARY OF INVENTION

Technical Problem

Since the above-described related art of Patent Literature 1 employs combustion exhaust gas as a drying heat source, it is essential to install a boiler for supplying the combustion exhaust gas. Moreover, because this related art does not recover latent heat in the process of drying biomass, there is a large heat loss.

With the above-described related art of Patent Literature 2, usage conditions are restricted because there is a risk of ignition if air is injected during the through-flow drying when drying a flammable raw material.

Since the above-described related art of Patent Literature 3 does not utilize the sensible heat of the drain to preheat a raw material, there is large heat loss via externally exhausted heat.

In this way, the related art described above requires a boiler to be installed as a drying heat source or has large energy consumption because effective utilization of sensible heat or latent heat is not realized; therefore, there is room for improvement in drying water-containing solid fuel with low energy consumption.

The present invention has been conceived in view of the above-described circumstances, and an object thereof is to provide a water-containing solid fuel drying apparatus and a drying method that are capable of eliminating a large-scale heat supply source, such as a boiler or the like, and that is also capable of efficiently drying with low energy consumption by effectively utilizing sensible heat or latent heat of a heating medium for drying, or the like.

Solution to Problem

In order to solve the above-described problems, the present invention employs the following solutions.

A water-containing solid fuel drying apparatus according a first aspect of the present invention is a water-containing solid fuel drying apparatus that dries water-containing solid fuel injected into a drying vessel by heating the water-containing solid fuel, including a dryer in which a heat transfer pipe for flowing drying gas is disposed in the drying vessel and into which scavenging gas is injected; a dust collector, into which the scavenging gas that has flowed out of the drying vessel is introduced in a form of microparticle-containing mixed gaseous fluid that contains vapor evaporated from the water-containing solid fuel and microparticles of the water-containing solid fuel, for removing the microparticles from the microparticle-containing mixed gaseous fluid; a compressor that compresses vapor-containing mixed gaseous fluid introduced thereinto by the scavenging gas that has passed through the dust collector; a heat exchanger that preheats low-pressure mixed gaseous fluid introduced into the compressor from the dust collector with high-pressure mixed-gaseous fluid that has been compressed at the compressor; and a gas-liquid separating device, in which the high-pressure mixed gaseous fluid supplied from the heat exchanger is employed as drying gas that becomes a heat source by passing through the heat transfer pipe, that performs gas-liquid separation by introducing water-containing scavenging gas which flows out from the heat transfer pipe while containing moisture formed through condensing of vapor contained in the gas, wherein the scavenging gas from which moisture has been removed at the gas-liquid separating device circulates while undergoing repeated phase changes through the microparticle-containing mixed gaseous fluid, mixed gaseous fluid, and the water-containing scavenging gas, in this order, and the water-containing solid fuel is dried by heating the water-containing solid fuel with latent heat of vapor contained in the mixed gaseous fluid and sensible heat of the mixed gaseous fluid. In the case in which the drying vessel has a fluidized bed, the scavenging gas may be employed as fluidizing gas. Hereinafter, descriptions will be given assuming that the drying vessel has a fluidized bed.

Such a water-containing solid fuel drying apparatus according to the first aspect of the present invention is provided with the dryer in which the heat transfer pipe for flowing the drying gas is disposed inside the drying vessel and that forms a fluidized bed by injecting fluidizing gas from a bottom portion of the vessel; a dust collector into which the fluidizing gas that has flowed out of the drying vessel is introduced in the form of the microparticle-containing mixed gaseous fluid that contains the vapor evaporated from the water-containing solid fuel and the microparticles of the water-containing solid fuel and that removes the microparticles from the microparticle-containing mixed gaseous fluid; a compressor that compresses vapor-containing mixed gaseous fluid introduced thereinto by the fluidizing gas that has passed through the dust collector; a heat exchanger that preheats the low-pressure mixed gaseous fluid, which is introduced into the compressor from the dust collector, with the high-pressure mixed gaseous fluid compressed by the compressor; a gas-liquid separating device in which the high-pressure mixed gaseous fluid supplied from the heat exchanger is employed as the drying gas that become a heat source by passing through the heat transfer pipe and that performs gas-liquid separation by introducing the water-containing fluidizing gas that flows out of the heat transfer pipe in a state in which it contains moisture condensed from the vapor in the gas. The fluidizing gas whose moisture has been removed at the gas-liquid separating device circulates while undergoing repeated phase changes among the microparticle-containing mixed gaseous fluid, the mixed gaseous fluid, and the water-containing fluidizing gas, in the stated order, thereby drying the water-containing solid fuel by heating the water-containing solid fuel with the latent heat of the vapor contained in the mixed gaseous fluid and the sensible heat of the mixed gaseous fluid. Accordingly, by effectively utilizing the sensible heat and the latent heat possessed by the mixed gaseous fluid, which is the drying gas serving as the heating medium for drying, it is possible to dry the water-containing solid fuel by efficiently heating it. Since the drying gas that serves as the heat source for drying the water-containing solid fuel is a mixed gaseous fluid of the fluidizing gas and the vapor, the boiling point of the vapor can be lowered by lowering the partial pressure of the steam. Therefore, the drying temperature can be lowered by the amount corresponding to the reduction in boiling point of the vapor.

With the above-described first aspect of the present invention, it is preferable that a primary-drying heat exchanger be provided that is disposed between the drying vessel and the gas-liquid separating device and that preheats the water-containing solid fuel before being injected in the drying vessel with the water-containing fluidizing gas that flows out of the heat transfer pipe; accordingly, the water-containing solid fuel is preheated by effectively utilizing the sensible heat possessed by the water-containing fluidizing gas, thereby making it possible to inject the water-containing solid fuel into the drying vessel with increased temperature.

With the above-described first aspect of the present invention, it is preferable that a pressure-release mechanism be provided that reduces the pressure of the fluidizing gas that has been separated at the gas-liquid separating device, before being injected into a vessel bottom portion of the drying vessel; accordingly, the fluidizing gas can be readily injected into the drying vessel which is at the atmospheric pressure. Therefore, a circulation system for the fluidizing gas is readily formed, thereby making it possible to employ the fluidizing gas for forming the fluidized bed and as the drying gas.

In this case, if an expansion turbine that is driven by the fluidizing gas by being coaxially connected to a driving source of the compressor is employed as the pressure-release mechanism, energy possessed by the fluidizing gas, in the form of pressure, etc., can be recovered and converted to motive power.

A pressure-release valve may be employed as the pressure-release mechanism in the case in which the scale of the drying apparatus is small and energy cannot be recovered through conversion to usable motive power, the case in which the initial cost needs to be suppressed, and so on.

With the above-described first aspect of the present invention, it is preferable that a preheating heating portion be provided that heats the fluidizing gas separated at the gas-liquid separating device and that injects the fluidizing gas into the drying vessel; accordingly, sensible heat possessed by the condensed water or dried solid fuel can be effectively utilized.

That is, if the temperature of the fluidizing gas is increased, before injecting it into the drying vessel, with the sensible heat possessed by the dried solid fuel dried at the dryer or the condensed water separated at the gas-liquid separating device, it is effective in maintaining the temperature in the drying vessel.

With the above-described first aspect of the present invention, it is preferable that a start-up heating portion be provided that heats the fluidizing gas separated at the gas-liquid separating device and/or water-containing solid fuel before being injected into the drying vessel; accordingly, the start-up heating portion heats at least one of the fluidizing gas and the water-containing solid fuel at the start-up time of the apparatus, when the temperature thereof is low, thereby making it possible to readily carry out warm-up in which the internal temperature of the vessel is increased. In this case, for example, an electric heater etc. can be employed as the start-up heating portion.

A water-containing solid fuel drying method according a second aspect of the present invention is a method of drying water-containing solid fuel, in which water-containing solid fuel injected into a drying vessel is dried by being heated, including forming a fluidized bed by injecting fluidizing gas from a bottom portion of a drying vessel in which a heat transfer pipe for flowing drying gas is disposed; forming a circulation system, in which the fluidizing gas repeatedly undergoes phase changes among initial fluidizing gas, microparticle-containing mixed gaseous fluid that contains vapor evaporated from the water-containing solid fuel and microparticles of the water-containing solid fuel, mixed gaseous fluid where the microparticles have been removed from the microparticle-containing mixed gaseous fluid, and water-containing fluidizing gas that contains water formed by condensation of the vapor produced by radiating heat to water-containing solid fuel after the pressure of the mixed gaseous fluid is increased, in this order; and flowing the mixed gaseous fluid inside the heat transfer pipe as the drying gas, and drying the water-containing solid fuel by heating the water-containing solid fuel with latent heat of vapor contained in the mixed gaseous fluid and sensible heat of the mixed gaseous fluid.

With such a water-containing solid fuel drying method according the second aspect of the present invention, a fluidized bed is formed by injecting fluidizing gas from a bottom portion of a drying vessel in which a heat transfer pipe for flowing drying gas is disposed; a circulation system is formed, in which the fluidizing gas repeatedly undergoes phase changes among initial fluidizing gas, microparticle-containing mixed gaseous fluid that contains vapor evaporated from water-containing solid fuel and microparticles of the water-containing solid fuel, mixed gaseous fluid where the microparticles have been removed from the microparticle-containing mixed gaseous fluid, and water-containing fluidizing gas that contains water formed by condensing of the vapor caused by heat transfer to water-containing solid fuel after pressure of the mixed gaseous fluid is increased, in the stated order; the mixed gaseous fluid flows inside the heat transfer pipe as the drying gas; and the water-containing solid fuel can be dried by heating it with the latent heat of the vapor contained in the mixed gaseous fluid and the sensible heat of the mixed gaseous fluid. Accordingly, by effectively utilizing the sensible heat and the latent heat contained by the mixed gaseous fluid which is the drying gas serving as the heating medium for drying, the water-containing solid fuel can be dried by heating it. Since the drying gas that serves as the heat source for drying the water-containing solid fuel is a mixed gaseous fluid of the fluidizing gas and the vapor, the boiling point of the vapor can be lowered by lowering the partial pressure of the steam. Therefore, the drying temperature can be lowered by an amount corresponding to the reduction in boiling point of the vapor.

The water-containing solid fuel drying apparatus according to the first aspect of the present invention and the drying method according to the second aspect of the present invention described above are configured to form a fluidized bed using fluidizing gas in a dryer that dries water-containing solid fuel by heating it. In the case in which sludge or the like is to be dried, however, it is also possible to employ an agitating dryer.

In the water-containing solid fuel drying apparatus according to the first aspect of the present invention, a dust collector is an essential, required component. However, depending on various conditions of the water-containing solid fuel, etc., an apparatus configuration without a dust collector is also possible.

Advantageous Effects of Invention

With the above described present invention, a circulation system in which fluidizing gas, which forms a fluid layer in a drying vessel, is formed, and mixed gaseous fluid in a state in which the fluidizing gas contains vapor evaporated from the water-containing solid fuel is used as drying gas (heating medium for drying) to be flowed in a heat transfer pipe in the drying vessel. Accordingly, by effectively utilizing the sensible heat of the drying gas and the latent heat of the vapor contained in the drying gas, the water-containing solid fuel drying apparatus and the drying method can dry water-containing solid fuel by efficiently heating it with low energy consumption. Therefore, a significant advantage is afforded in that a large-scale equipment, such as a boiler or the like, is not required as a drying heat source, thereby making it possible to provide a compact, low-cost, efficient water-containing solid fuel drying apparatus and a drying method.

The drying gas used for drying water-containing solid fuel is mixed gaseous fluid of the fluidizing gas and the vapor. Therefore, because the boiling point of the vapor can be lowered by lowering the partial pressure of steam, the drying temperature can be set lower by the amount corresponding to the reduction in boiling point of the vapor by adjusting the partial pressure of steam in the drying vessel in accordance with the injected quantity of the fluidizing gas. Accordingly, the present invention is particularly suitable as a drying apparatus and a drying method for drying water-containing solid fuel whose properties change when dried at high temperature.

DESCRIPTION OF EMBODIMENTS

Embodiments of a water-containing solid fuel drying apparatus and drying method according to the present invention will be described below with reference to the drawings.
<First Embodiment>

Figure 1:
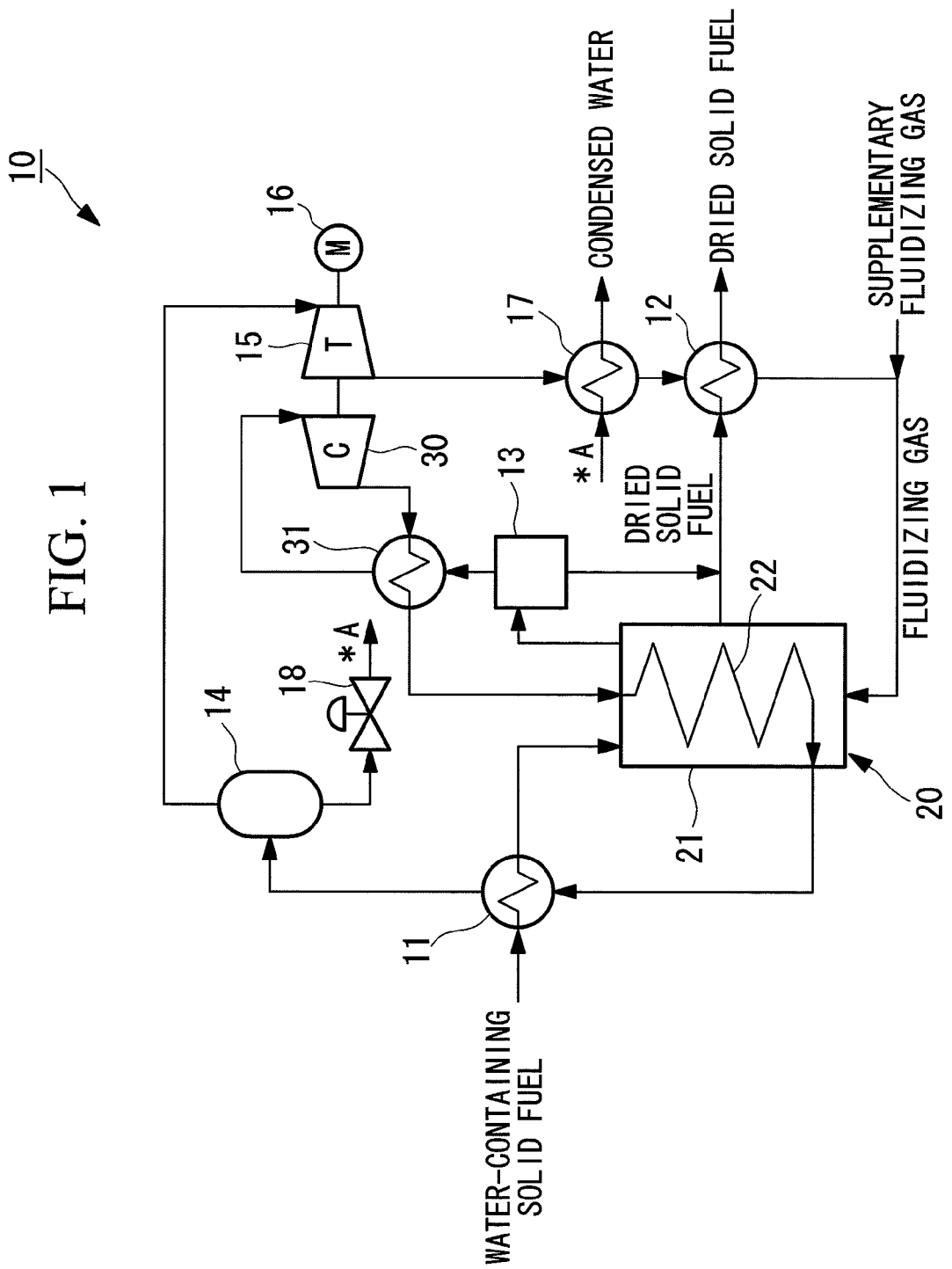
FIG. 1 is a systematic diagram of the apparatus configuration showing a first embodiment of a water-containing solid fuel drying apparatus according to the present invention.

A drying apparatus 10 of the embodiment shown in FIG. 1 is an apparatus that evaporates moisture in water-containing solid fuel having a high water content, which serves a raw material, by heating it, dries the solid fuel by removing moisture until the water content is lowered to a predetermined level, and then supplies it to a subsequent process as dried solid fuel suitable for combustion.

As described below, this drying apparatus 10 utilizes sensible heat of drying gas and latent heat of drying moisture (vapor) as drying heat sources. In this case, scavenging gas that circulates in a system is used as the drying gas, and the scavenging gas, in the state in which it is used as the drying gas, contains vapor, which is the drying moisture evaporated from the water-containing solid fuel upon heating. When a drying vessel 21 has a fluidized bed, the scavenging gas is employed as fluidizing gas. Hereinafter, descriptions will be given assuming that the drying vessel 21 has a fluidized bed.

In this drying apparatus 10, the water-containing solid fuel to be dried passes through a primary-drying heat exchanger 11 first, and is consequently injected into the drying vessel 21 of a dryer 20 in a state in which it has undergone primary drying (temperature increase) by being subjected to primary heating. This water-containing solid fuel is heated in the drying vessel 21, and moisture therein is evaporated until a predetermined water content is reached.

In this way, the water-containing solid fuel that has passed through the dryer 20 is converted to high-temperature dried solid fuel that has been dried to the predetermined water content and is supplied to a heat-radiating heat exchanger 12 disposed at a downstream side thereof. Since the high-temperature dried solid fuel undergoes heat exchange with the fluidizing gas, which is described later, at this heat-radiating heat exchanger 12, the dried solid fuel whose temperature has been lowered by heat transfer to the fluidizing gas is supplied to a subsequent process.

With the above-described dryer 20, in order to increase the drying efficiency by agitating the water-containing solid fuel injected thereinto after the primary drying, a fluidized bed is formed inside the drying vessel 21. Furthermore, the dryer 20 is provided with a heat transfer pipe 22 that heats the water-containing solid fuel inside the drying vessel 21.

The fluidized bed of the dryer 20 is formed by introducing noncondensable fluidizing gas from a bottom portion of the drying vessel 21 as agitating ways. Here, in considering examples of preferable noncondensable fluidizing gases, a gas having properties that do not cause condensation inside the drying vessel 21 needs to be used, and it is preferable that air be used when drying water-containing solid fuel that does not easily ignite. When drying water-containing solid fuel that easily ignites, it is preferable to use, for example, nitrogen, carbon dioxide, or exhaust gas or the like that contains nitrogen, carbon dioxide and so forth, thus having a low oxygen content.

On the other hand, fluid compressed at the compressor 30 is introduced into the heat transfer pipe 22 disposed inside the drying vessel 21 as the drying gas (heating medium). This drying gas is mixed gaseous fluid in which moisture (vapor) evaporated from the water-containing solid fuel inside the dryer 20 is added to the fluidizing gas that has formed the fluidized bed. This mixed gaseous fluid contains microparticles of scattered solid fuel at the moment where it has flowed out from the dryer 20; therefore, in the following description, the fluidizing gas containing the vapor and the microparticles will be referred to as "microparticle-containing mixed gaseous fluid" and the fluidizing gas containing only the vapor will be referred to as "mixed gaseous fluid", for distinction therebetween.

Accordingly, a dust collector 13 that removes the microparticles of solid fuel from the microparticle-containing mixed gaseous fluid is disposed on the downstream side of the dryer 20 so that only the mixed gas fluid that has passed through the dust collector 13 is supplied to the compressor 30. Since the microparticles of solid fuel that have been separated/removed from the mixed gaseous fluid at the dust collector 13 are recovered by being merged with the main flow of the solid fuel between the dryer 20 and the heat-radiating heat exchanger 12, they can be used as the dried solid fuel.

A vapor heat exchanger 31 that heats the vapor contained in the mixed gaseous fluid is disposed between the dust collector 13 and the compressor 30. This vapor heat exchanger 31 performs heat exchange between low-pressure evaporated moisture (vapor) before compression and high-pressure evaporated moisture (vapor) after compression and can heat the low-pressure vapor in the mixed gaseous fluid introduced from the dust collector 13 to the saturation temperature or above. That is, because the fluid compressed at the compressor 31 has properties causing it to increase in temperature, the high-pressure vapor whose temperature is increased after the compression heats the low-pressure vapor before the compression, and thus, the low-pressure vapor in the mixed gaseous fluid can be heated to high temperature at or above the saturation temperature. In other words, the vapor heat exchanger 31 is a heat exchanger that increases the degree of superheating of the low-pressure vapor before compression by preheating it.

At this time, because the microparticles of the solid fuel scattered from the dryer have been removed at the dust collector 13 disposed upstream, the microparticles can be prevented from deteriorating the heat conduction performance by becoming attached to a heat conduction surface of the vapor heat exchanger 31, and the microparticles can be prevented from causing accelerated wear of blades of the compressor 30.

The mixed gaseous fluid that has heated the low-pressure vapor by passing through the vapor heat exchanger 31 is introduced into the heat transfer pipe 22 of the dryer 20. That is, the high-pressure mixed gas fluid to be flowed inside the heat transfer pipe 22 as the drying gas is highly superheated because the temperature thereof has been further increased by being pressurized after the low-pressure steam is heated to or above the saturation temperature.

This mixed gaseous fluid heats the water-containing solid fuel that is injected into the drying vessel 21 of the dryer 20. At this time, moisture (vapor) in the mixed gaseous fluid condenses into liquid (water) at an internal surface of the heat transfer pipe 22; therefore, the latent heat of condensation radiated during this time can be effectively utilized for heating for drying. Since the mixed gaseous fluid whose vapor has condensed in this way becomes a mixed fluid of the fluidizing gas and water, it will be hereinafter referred to as "water-containing fluidizing gas" for distinction.

Furthermore, because the pressure of the mixed gaseous fluid is high after having been pressurized at the compressor 30, the condensation temperature of the vapor contained in the mixed gaseous fluid is higher than the boiling point of moisture contained in the water-containing solid fuel that is heated in the drying vessel 21, which is at the atmospheric pressure. Therefore, because the latent heat of condensation of the vapor that condenses inside the heat transfer pipe 22 can be efficiently transferred from the mixed gaseous fluid in the heat transfer pipe 22 to the water-containing solid fuel, effective heating of the water-containing solid fuel becomes possible.

At an outlet of the dryer 20, because the temperatures of the fluidizing gas and the condensed water are high, that is, because the temperature of the water-containing fluidizing gas is high, this water-containing fluidizing gas can be supplied to the primary-drying heat exchanger 11 described above and the sensible heat thereof can be utilized as a heating heat source.

The water-containing fluidizing gas that has performed the primary heating of the water-containing solid fuel by passing through the primary-drying heat exchanger 11 is introduced into the gas-liquid separator (gas-liquid separating device) 14. At this gas-liquid separator 14, the water-containing fluidizing gas is separated into gaseous fluidizing gas and liquid water.

The fluidizing gas that has been separated at the gas-liquid separator 14 is supplied to an expansion turbine 15 provided as a pressure-release mechanism. This expansion turbine 15 recovers energy in the form of pressure, etc. possessed by the fluidizing gas by converting it to a rotational driving force. This expansion turbine 15 is coaxially connected to an electric motor 16 and is used as a driving source for operating the compressor 30 described above.

As a result, in the drying apparatus 10, because the power consumption of the electric motor 16 required for driving the compressor 30 can be reduced by the amount corresponding to motive power recovered in the expansion turbine 15, energy can be saved in the operation thereof. The fluidizing gas that has passed through the expansion turbine 15 is decompressed to a certain level of low pressure that allows it be injected into the drying vessel 21, which is operated at atmospheric pressure The fluidizing gas that has performed work at the expansion turbine 15 is decompressed in this way is further increased in temperature by being preheated upon passing through a condensing heat exchanger 17 and the heat-radiating heat exchanger 12, and, subsequently, is reinjected into the drying vessel 21, which is at atmospheric pressure, as the fluidizing gas for forming the fluidized bed described above. Even when the fluidizing gas that has been preheated by passing through the condensing heat exchanger 17 and the heat-radiating heat exchanger 12 is injected into the drying vessel 21, a temperature drop in the vessel can be minimized.

With regard to the condensing heat exchanger 17 and the heat-radiating heat exchanger 12 described above, it should be appropriately judged, whether they are to be installed in series or parallel or whether or not they are to be installed, depending on necessity or depending on the sensible heat possessed by the condensed water or the dried solid fuel. FIG. 1 shows an example in which the heat exchangers 17 and 12 are installed in series in this order.

That is, the fluidizing gas circulates, in the stated order, through the drying vessel 21 of the dryer 20, the dust collector 13, the compressor 30, the vapor heat exchanger 31, the heat transfer pipe 22 of the dryer 20, the primary heating heat exchanger 11, the gas-liquid separator 14, the expansion turbine 15, the condensing heat exchanger 17, and the heat-radiating heat exchanger 12, undergoes phase changes among the fluidizing gas, the microparticle-containing mixed gaseous fluid, the mixed gaseous fluid, and the water-containing fluidizing gas, in the stated order, and is then reused upon returning to the fluidizing gas again.

In this circulation system, part of the fluidizing gas dissolves into the evaporated moisture of the water-containing solid fuel in the drying vessel 21 of the dryer 20 and is discharged from the system along with the condensed water, which is described later; therefore, for example, supplementary fluidizing gas is additionally injected upstream of the drying vessel 21 on an inlet side thereof to ensure the required quantity.

On the other hand, the condensed water separated at the gas-liquid separator 14 is supplied to the condensing heat exchanger 17, after being decompressed at a pressure-release valve 18, and the sensible heat thereof is used to preheat the fluidizing gas. The condensed water whose temperature has been lowered at the condensing heat exchanger 17 in this way is discharged to an appropriate place outside the system.

In this way, the drying apparatus 10 described above is configured so as to form a fluidizing-gas circulation system, to utilize the vapor-containing mixed gaseous fluid as the heat source (drying gas) for drying the water-containing solid fuel, and to reuse the water-containing fluidizing gas, which contains water generated from condensation of the vapor caused by heating, as the fluidizing gas after removing the water by gas-liquid separation. Accordingly, drying is enhanced by effectively utilizing the sensible heat and the latent heat of condensation possessed by the mixed gaseous fluid that serves as the drying gas.

In addition, because the heat source (drying gas) for drying the water-containing solid fuel is the mixed gaseous fluid of the fluidizing gas and the vapor, the boiling point of the vapor can be lowered by lowering the partial pressure of steam. At this time, because the partial pressure of steam in the drying vessel 21 can be adjusted in accordance with the injected quantity of the fluidizing gas, the drying temperature can be lowered by the amount corresponding to the reduction in boiling point of the vapor; therefore, it is particularly suitable for drying water-containing solid fuel whose properties change when dried at high temperature.

By employing noncondensable gas as the fluidizing gas to be injected into the drying vessel 21, the above described drying apparatus 10 can prevent the occurrence of problems in the flow of the water-containing solid fuel due to condensing of the fluidizing gas at an injection portion, thereby enabling stable operation.

Since the above-described drying apparatus 10 is configured so as to reuse the noncondensable gas through circulation thereof by forming a circulation system for the fluidizing gas in which the noncondensable gas is used, motive power can be recovered from the noncondensable gas, for example, at the expansion turbine 15 or the like; moreover, because the noncondensable gas needs to be replenished only in the amount that has been dissolved out, the consumption thereof can be suppressed, making it economical.

The above-described drying apparatus 10 performs primary heating of the water-containing solid fuel with the primary heating heat exchanger 11, compression of the mixed gaseous fluid after heating it with the vapor heat exchanger 31, and preheating of the fluidizing gas with the condensing heat exchanger 17 and the heat-radiating heat exchanger 12, thereby making it possible to realize effective use of heat, which minimizes waste heat.

<Second Embodiment>

Figure 2:
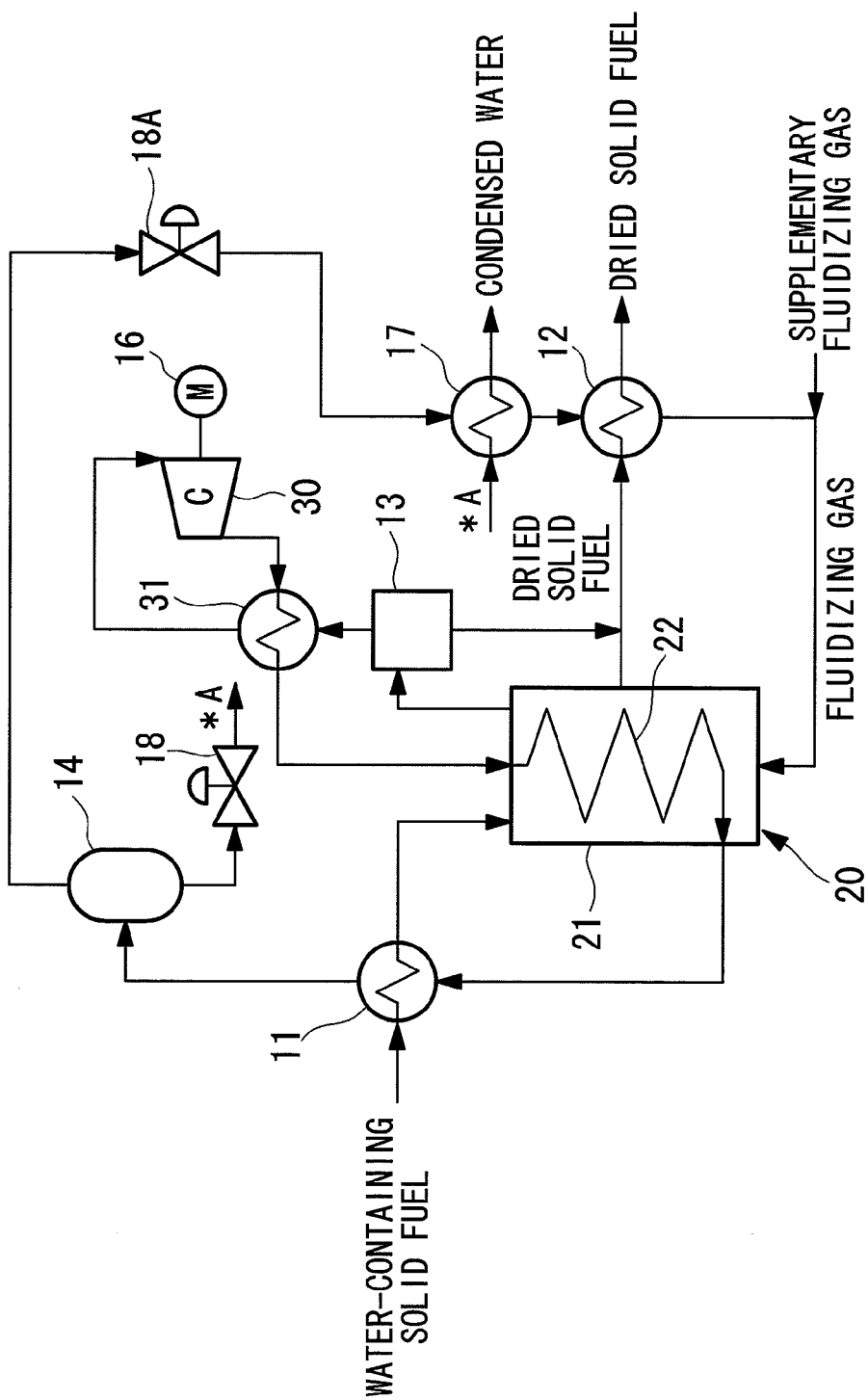
FIG. 2 is a systematic diagram of the apparatus configuration showing a second embodiment of a water-containing solid fuel drying apparatus according to the present invention.

Next, with regard to the water-containing solid fuel drying apparatus according to the present invention, a second embodiment thereof will be described on the basis of FIG. 2. The same reference signs are given to the components that are the same as those in the above-described embodiment, and detailed descriptions thereof will be omitted.

In this embodiment, a drying apparatus 10A is described, in which a pressure-release valve 18A is provided instead of the expansion turbine 15 provided as a pressure-release mechanism. This pressure-release valve 18A simply reduces the pressure of the fluidizing gas introduced from the gas-liquid separator 14 after the vapor separation and reduces the pressure of the fluidizing gas to a low pressure that allows it to be injected into the drying vessel 21 of the dryer 20, which is operated under atmospheric pressure. That is, the pressure-release valve 18A reduces the pressure of the fluidizing gas, so that the drying vessel 21 need not be a pressure vessel and, moreover, reduces its pressure to a certain level of pressure at which the fluidizing gas that has passed through the condensing heat exchanger 17 and the heat-radiating heat exchanger 12 is injected into the drying vessel 21.

It is effective to employ such a pressure-release valve 18A, for example, in the case in which the scale of the drying apparatus 10A is small and usable motive power cannot be obtained even if energy is recovered with the expansion turbine 15, the case in which the cost of recovering energy obtained due to the expansion turbine 15 is larger than cost savings obtained due to the reduction of power consumption, the case in which initial costs incurred in installing the expansion turbine 15 need to be suppressed, and so on.

<Third Embodiment>

Figure 3:
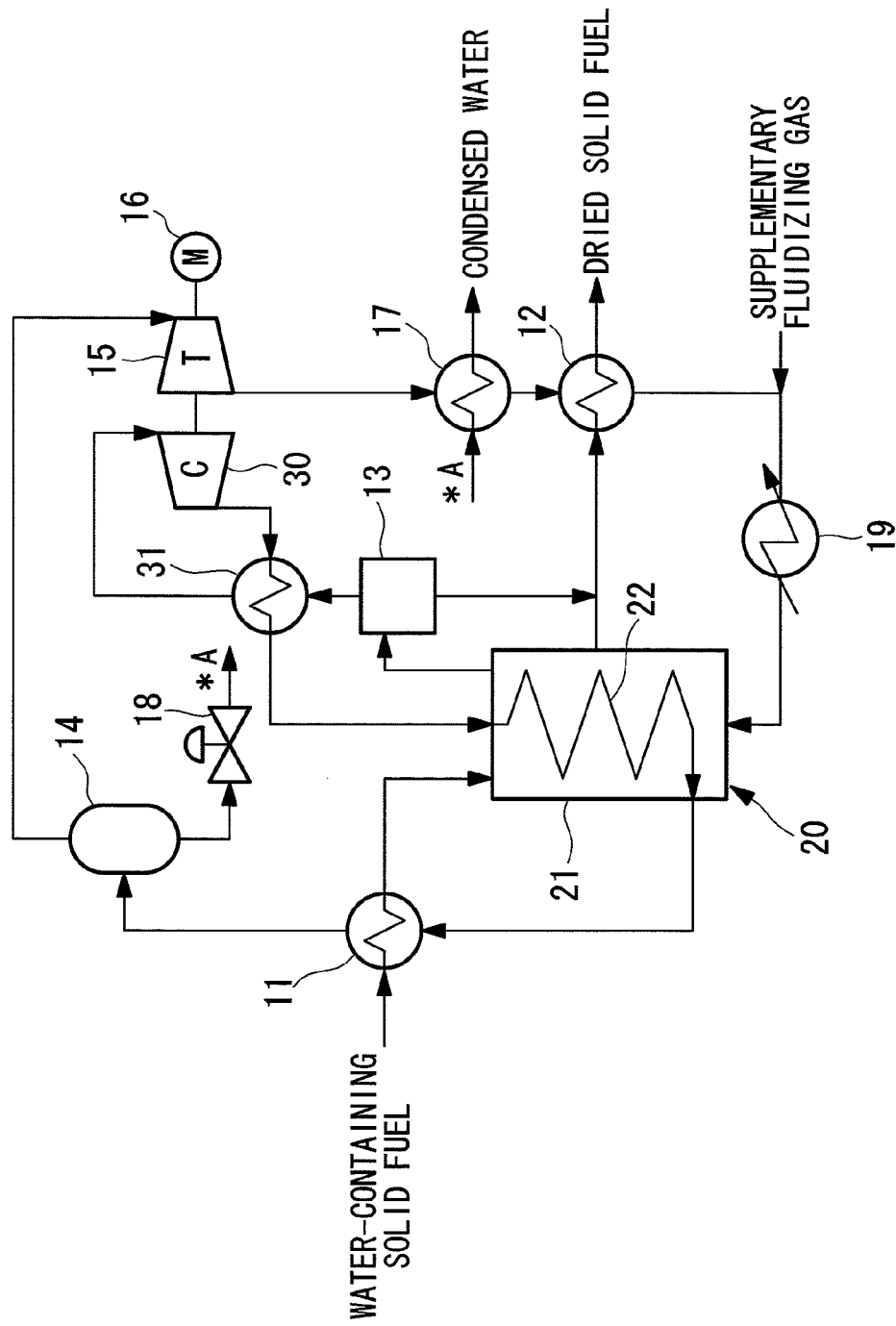
FIG. 3 is a systematic diagram of the apparatus configuration showing a third embodiment of a water-containing solid fuel drying apparatus according to the present invention.

Next, with regard to the water-containing solid fuel drying apparatus according to the present invention, a third embodiment thereof will be described on the basis of FIG. 3. The same reference signs are given to the components that are the same as those in the above-described embodiments, and detailed descriptions thereof will be omitted.

In this embodiment, a drying apparatus 10B is provided with a heater 19 near the drying vessel 21 on the upstream side thereof as a start-up heating portion that heats the fluidizing gas separated at the gas-liquid separator 14. In the illustrated configuration example, the heater 19 is provided between the heat-radiating heat exchanger 12 and the drying vessel 21 and is operated when starting up the drying apparatus 10B to heat the fluidizing gas.

It is preferable that the heater 19 be one in which heating can easily be turned on/off; for example, an electric heater etc. that is activated to perform heating when starting up the drying apparatus 10B is conceivable.

By providing such a heater 19, because the interior of the drying vessel 21 is normally at a low temperature when starting up the operation of the drying apparatus 10B, by injecting high-temperature fluidizing gas that has been heated by the heater 19, the internal temperature of the drying vessel 21 can be increased in a short period of time. Accordingly, the drying vessel 21 can easily be warmed up, thus making it possible to shift to the normal drying operation in a short period of time. Given the purpose of installing the heater 19, it is desirable that the installation position thereof be located as close as possible to the drying vessel 21 on the upstream side thereof.

<Fourth Embodiment>

Figure 4:
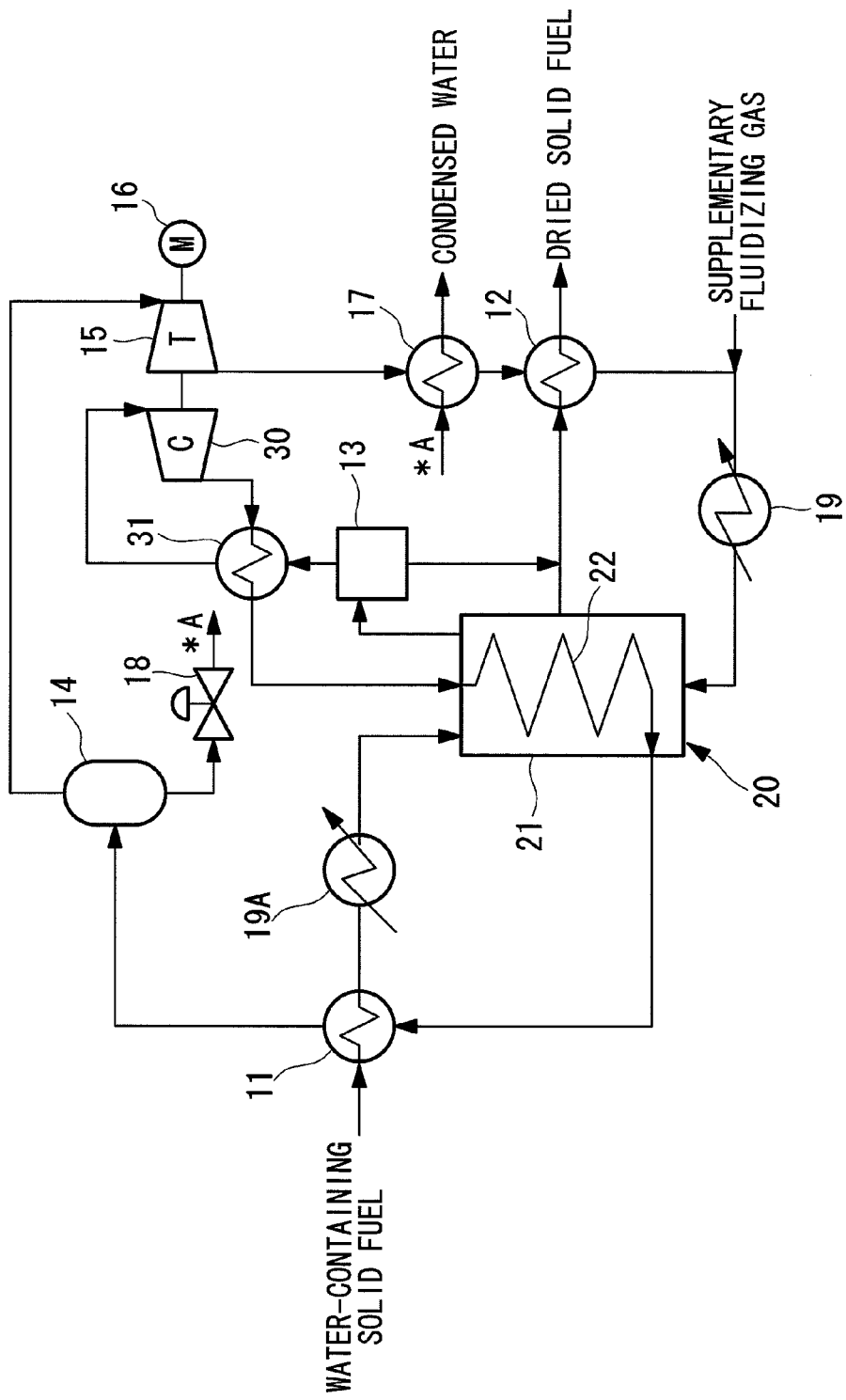
FIG. 4 is a systematic diagram of the apparatus configuration showing a fourth embodiment of a water-containing solid fuel drying apparatus according to the present invention.

Next, with regard to the water-containing solid fuel drying apparatus according to the present invention, a fourth embodiment thereof will be described on the basis of FIG. 4. The same reference signs are given to the components that are the same as those in the above-described embodiments, and detailed descriptions thereof will be omitted.

A drying apparatus 100 of this embodiment is provided with a heater 19A as a start-up heating portion that heats the water-containing solid fuel before being injected into the drying vessel 21. In the illustrated example configuration, the heater 19A is provided between the primary heating heat exchanger 11 and the drying vessel 21 and is operated when starting up the drying apparatus 10C to heat the water-containing solid fuel.

Similarly with the heater 19 described above, it is preferable that the heater 19A be one in which heating can easily be turned on/off; for example, an electric heater that is activated to perform heating when starting up the drying apparatus 10C.

By providing such a heater 19A, because the interior of the drying vessel 21 is normally at a low temperature when starting up the operation of the drying apparatus 100, by injecting the water-containing solid fuel whose temperature has been increased by being heated by the heater 19A, the amount of time required to increase the internal temperature of the drying vessel 21 can be shortened. Accordingly, the drying vessel 21 can easily be warmed up, thus making it possible to shift to the normal drying operation in a short period of time. Given the purpose of installing the heater 19A, it is desirable that the installation position thereof be located as close as possible to the drying vessel 21 on the upstream side thereof.

By employing the heater 19 described in the third embodiment in combination with this heater 19A, the heater 19A can further shorten the amount of time required for increasing the internal temperature of the drying vessel 21. That is, of these heaters 19 and 19A, only one or the other may be installed or both may be installed, depending on various conditions.

In this way, each embodiment of the drying apparatuses 10 and 10A to 10C employs a method described below as the method of drying water-containing solid fuel, in which the water-containing solid fuel injected into the drying vessel 21 is dried by being heated.

That is, a drying method is employed in which the fluidized bed is formed by injecting the fluidizing gas from the bottom portion of the drying vessel 21, in which the heat transfer pipe 22 for flowing the drying gas is disposed; the circulation system is formed in which this fluidizing gas repeatedly undergoes a four-stage phase change among the initial fluidizing gas, the microparticle-containing mixed gaseous fluid, the mixed gaseous fluid, and the water-containing fluidizing gas, in the stated order; and thus, the mixed gaseous fluid flows inside the heat transfer pipe 22 as the drying gas, and the water-containing solid fuel is dried by heating it with the latent heat of the vapor contained in the mixed gaseous fluid and the sensible heat of the mixed gaseous fluid.

Here, the microparticle-containing mixed gaseous fluid is a fluid that contains the vapor evaporated from the water-containing solid fuel and the microparticles of the water-containing solid fuel, and the fluid formed by removing the microparticles from the microparticle-containing mixed gaseous fluid become the mixed gaseous fluid. Then, this mixed gaseous fluid, after being pressurized at the compressor 30, flows inside the heat transfer pipe 22 as the drying gas, and, because heat is radiated to the water-containing solid fuel during this time, causing vapor to condense, flows out from the heat transfer pipe 22 as the water-containing fluidizing gas which contains water generated due to condensation of the vapor.

Subsequently, the water-containing fluidizing gas undergoes gas-liquid separation at the gas-liquid separator 14, thereby returning to fluidizing gas from which moisture is removed. Since this fluidizing gas is injected into the drying vessel 21 again for formation of the fluidized bed, thereafter, the fluidizing gas is circulated while repeatedly undergoing the same phase changes.

Since part of the fluidizing gas dissolved in the condensed water is discharged from the system, the required quantity is ensured by, for example, additionally injecting the supplementary fluidizing gas upstream of the drying vessel 21 on the inlet side thereof.

In this way, with the drying apparatuses 10 and 10A to 10C and the drying method of the present invention described above, a closed-circuit circulation system is formed in which the fluidizing gas that forms a fluid layer inside the drying vessel 21 circulates, and the mixed gaseous fluid, which is the fluidizing gas containing the vapor evaporated from the water-containing solid fuel, is used as the drying gas that flows inside the heat transfer pipe 22 disposed inside the drying vessel 21. Accordingly, the sensible heat possessed by the drying gas and the latent heat of the vapor contained in the drying gas are effectively utilized, thereby making it possible to more efficiently dry the water-containing solid fuel by heating it with low energy consumption. Therefore, a large-scale equipment such as a boiler or the like is not required as a drying heat source, thereby making it possible to provide a compact, low-cost, efficient water-containing solid fuel drying apparatus and a drying method.

With the drying apparatuses 10 and 10A to 10C and the drying method of the present invention described above, because the drying gas used for drying the water-containing solid fuel is the mixed gaseous fluid of the fluidizing gas and the vapor, the boiling point of the vapor is also lowered by lowering the partial pressure of steam. Accordingly, if the partial pressure of steam in the drying vessel 21 is adjusted by increasing/decreasing the injected quantity of the fluidizing gas, the drying temperature can be set lower by lowering the boiling point of the vapor, and therefore, the drying apparatuses and the drying method of the present invention are particularly suitable for drying water-containing solid fuel whose properties change when dried at high temperature.

The present invention is not limited to the above-described embodiments and can be appropriately altered within a range that does not depart from the spirit thereof.

REFERENCE SIGNS LIST 10 drying apparatus
11 primary-drying heat exchanger
12 heat-radiating heat exchanger
13 dust collector
14 gas-liquid separator
15 expansion turbine
16 electric motor
17 condensing heat exchanger
18, 18A pressure-release valve
19, 19A heater
20 dryer
21 drying vessel
22 heat transfer pipe
30 compressor
31 vapor heat exchanger

The invention claimed is:

1. A water-containing solid fuel drying apparatus, comprising:
a dryer that dries water-containing solid fuel by heating the water-containing solid fuel with drying gas, the dryer including a drying vessel into which the water-containing solid fuel and scavenging gas is injected and a heat transfer pipe for flowing the drying gas, the heat transfer pipe being disposed in the drying vessel;
a dust collector, into which the scavenging gas that has flowed out of the drying vessel is introduced in a form of first mixed gaseous fluid that contains vapor evaporated from the water-containing solid fuel and microparticles of the water-containing solid fuel, for removing the microparticles from the first mixed gaseous fluid and generating second mixed gaseous fluid that contains the vapor and the scavenging gas;
a compressor that compresses the second mixed gaseous fluid introduced thereinto and generates the drying gas;
a turbine that is used as a driving source for operating the compressor;
a heat exchanger that preheats the second mixed gaseous fluid with the drying gas that has been compressed at the compressor and has higher pressure than pressure of the second mixed gaseous fluid and that supplies the second mixed gaseous fluid that has been preheated to the compressor, the heat exchanger introducing the second mixed gaseous fluid from the dust collector and introducing the drying gas from the compressor; and
a gas-liquid separating device that performs gas-liquid separation by introducing water-containing scavenging gas which flows out from the heat transfer pipe, the water-containing scavenging gas being gas that contains moisture formed through condensing of vapor contained in the drying gas, the gas-liquid separating device supplying the scavenging gas separated from the water-containing scavenging gas to the turbine, wherein
the scavenging gas generated by removing the moisture from the water-containing scavenging gas at the gas-liquid separating device circulates while undergoing repeated phase changes through the first mixed gaseous fluid, the second mixed gaseous fluid, the drying gas, and the water-containing scavenging gas, in this order, the water-containing scavenging gas is reused upon returning to the scavenging gas, and the water-containing solid fuel is dried by heating the water-containing solid fuel with latent heat of vapor contained in the drying gas and sensible heat of the drying gas.

2. A water-containing solid fuel drying apparatus according to claim 1, wherein a fluidized bed is employed in the drying vessel and the scavenging gas serves as fluidizing gas.

3. A water-containing solid fuel drying apparatus according to claim 1, further comprising
a primary-drying heat exchanger that is disposed between the drying vessel and the gas-liquid separating device and that preheats the water-containing solid fuel before being injected in the drying vessel with the water-containing scavenging gas that flows out of the heat transfer pipe.

4. A water-containing solid fuel drying apparatus according to claim 1, further comprising
a pressure-release mechanism that reduces the pressure of the scavenging gas that has been separated at the gas-liquid separating device, before being injected into a vessel bottom portion of the drying vessel.

5. A water-containing solid fuel drying apparatus according to claim 4, wherein the pressure-release mechanism is the turbine that is coaxially connected to the compressor as the driving source of the compressor and that is driven by the scavenging gas.

6. A water-containing solid fuel drying apparatus according to claim 4, wherein the pressure-release mechanism is a pressure-release valve.

7. A water-containing solid fuel drying apparatus according to claim 1, further comprising
a preheating heating portion that heats the scavenging gas separated at the gas-liquid separating device and that injects the scavenging gas into the drying vessel.

8. A water-containing solid fuel drying apparatus according to claim 1, further comprising a start-up heating portion that heats the scavenging gas separated at the gas-liquid separating device and/or the water-containing solid fuel before being injected into the drying vessel.

9. A method of drying water-containing solid fuel, comprising:
forming a fluidized bed by injecting fluidizing gas from a bottom portion of a drying vessel in which a heat transfer pipe for flowing drying gas is disposed;
drying water-containing solid fuel injected into the drying vessel by heating the water-containing solid fuel with the drying gas;
generating second mixed gaseous fluid that contains vapor and the fluidizing gas by removing microparticles of the water-containing solid fuel from first mixed gaseous fluid that contains the vapor evaporated from the water-containing solid fuel and the microparticles of the water-containing solid fuel;
generating the drying gas by compressing the second mixed gaseous fluid at a compressor;
preheating the second mixed gaseous fluid with the drying gas that has been compressed at the compressor and has higher pressure than pressure of the second mixed gaseous fluid by introducing the second mixed gaseous fluid and the drying gas into a heat exchanger, the second mixed gaseous fluid that has been preheated being supplied to the compressor;
generating the fluidizing gas by removing moisture from water-containing fluidizing gas which flows out from the heat transfer pipe, the water-containing fluidizing gas being gas that contains the moisture formed through condensing of vapor contained in the drying gas;
supplying the fluidizing gas to a turbine that is used as a driving source for operating the Compressor;

forming a circulation system, in which the fluidizing gas repeatedly undergoes phase changes among initial fluidizing gas, the first mixed gaseous fluid, the second mixed gaseous fluid, the drying gas and the water-containing fluidizing gas, in this order, and the water-containing fluidizing gas is reused upon returning to the fluidizing gas; and drying the water-containing solid fuel by heating the water-containing solid fuel with latent heat of vapor contained in the drying gas and sensible heat of the drying gas.

10. A water-containing solid fuel drying apparatus, comprising:

a dryer that dries water-containing solid fuel by heating the water-containing solid fuel with drying gas, the dryer including a drying vessel into which the water-containing solid fuel and scavenging gas is injected and a heat transfer pipe for flowing the drying gas, the heat transfer pipe being disposed in the drying vessel;

a dust collector, into which the scavenging gas that has flowed out of the drying vessel is introduced in a form of first mixed gaseous fluid that contains vapor evaporated from the water-containing solid fuel and microparticles of the water-containing solid fuel, for removing the microparticles from the first mixed gaseous fluid and generating second mixed gaseous fluid that contains the vapor and the scavenging gas;

a compressor that compresses the second mixed gaseous fluid introduced thereinto and generates the drying gas;

a turbine that is used as a driving source for operating the compressor;

a heat exchanger that preheats the second mixed gaseous fluid with the drying gas that has been compressed by the compressor and has higher pressure than pressure of the second mixed gaseous fluid and that supplies the second mixed gaseous fluid that has been preheated to the compressor, the heat exchanger introducing the second mixed gaseous fluid from the dust collector and introducing the drying gas from the compressor;

a gas-liquid separating device that performs gas-liquid separation by introducing water-containing scavenging gas which flows out from the heat transfer pipe, the water-containing scavenging gas being gas that contains moisture formed through condensing of vapor contained in the drying gas, the gas-liquid separating device supplying the scavenging gas separated from the water-containing scavenging gas to the turbine; and a primary-drying heat exchanger that is disposed between the drying vessel and the gas-liquid separating device and that preheats the water-containing solid fuel before being injected in the drying vessel with the water-containing scavenging gas that flows out of the heat transfer pipe, wherein the scavenging gas generated by removing the moisture from the water-containing scavenging gas at the gas-liquid separating device circulates while undergoing repeated phase changes through the first mixed gaseous fluid, the second mixed gaseous fluid, the drying gas, and the water-containing scavenging gas, in this order, the water-containing scavenging gas is reused upon returning to the scavenging gas, and the water-containing solid fuel is dried by heating the water-containing solid fuel with latent heat of vapor contained in the drying gas and sensible heat of the drying gas.

11. A water-containing solid fuel drying apparatus according to claim 1, wherein the heat exchanger heats vapor contained in the second mixed gaseous fluid to saturation temperature or above.

12. A water-containing solid fuel drying apparatus according to claim 10, wherein the heat exchanger heats vapor contained in the second mixed gaseous fluid to saturation temperature or above.

* * * * *